United States Patent [19]
Kilian et al.

[11] Patent Number: 5,403,072
[45] Date of Patent: Apr. 4, 1995

[54] BRAKE PRESSURE CONTROL DEVICE FOR OPTIMIZING THE BRAKE-LINING WEAR OF MOTOR VEHICLE BRAKES

[75] Inventors: Ulrich Kilian, Albershausen; Hannes Wahle, Plochingen; Karl Kühn, Schorndorf, all of Germany

[73] Assignee: Mercedes-Benz AG, Stuttgart, Germany

[21] Appl. No.: 54,255

[22] Filed: Apr. 30, 1993

[30] Foreign Application Priority Data

Apr. 30, 1992 [DE] Germany .................. 42 14 182.6

[51] Int. Cl.⁶ .................. B60T 8/18; B60T 8/26; B60T 17/22
[52] U.S. Cl. .................. 303/3; 188/1.11; 188/195; 188/349; 303/9.69; 303/22.1; 303/15
[58] Field of Search .............. 188/1.11, 181 T, 106 P, 188/196 R, 71.7, 79.51, 195, 349, 382, 71.8, 204 R, 217, 156–165; 303/9.61, 9.62, 100, 111, 112, 7, 3, 8, 9.63–9.76, 22.1–22.8, 13–20, DIG. 3, DIG. 4, 93, 1, 84.1, 119.1, 119.2

[56] References Cited

U.S. PATENT DOCUMENTS

| | | | |
|---|---|---|---|
| 3,774,975 | 11/1973 | Schmidt | 303/7 |
| 4,076,330 | 2/1978 | Leiber | 188/1.11 |
| 4,418,963 | 12/1983 | Sprockhoff | 303/3 |
| 4,568,129 | 2/1986 | Stumpe | 303/22.8 |
| 4,632,466 | 12/1986 | Grauel et al. | 303/22.8 |
| 4,685,745 | 8/1987 | Reinecke | 303/100 |
| 4,768,840 | 9/1988 | Sullivan et al. | 303/22.1 |
| 4,804,234 | 2/1989 | Gee et al. | 303/22.1 |
| 4,861,115 | 8/1989 | Petersen | 303/22.1 |
| 4,923,056 | 5/1990 | Nedelk | 303/9.61 |
| 4,964,679 | 10/1990 | Rath | 188/1.11 |
| 4,971,179 | 11/1990 | Gebhardt et al. | 303/20 |
| 4,986,610 | 1/1991 | Beck et al. | 303/9.61 |
| 5,011,236 | 4/1991 | Toepfer et al. | 303/95 |
| 5,145,239 | 9/1992 | Meise et al. | 303/14 |
| 5,163,742 | 11/1992 | Toepfer et al. | 303/95 |
| 5,172,960 | 12/1992 | Chareire | 303/15 |
| 5,184,875 | 2/1993 | Wrede | 303/20 |
| 5,251,966 | 10/1993 | Friederichs et al. | 303/15 |

FOREIGN PATENT DOCUMENTS

| | | |
|---|---|---|
| 3311556 | 10/1984 | Germany . |
| 3312980 | 10/1984 | Germany . |
| 3313078 | 10/1984 | Germany . |
| 3937070 | 5/1991 | Germany . |

Primary Examiner—Douglas C. Butler
Attorney, Agent, or Firm—Evenson, McKeown, Edwards & Lenahan

[57] ABSTRACT

A brake-pressure control device is disclosed with a service-brake valve for allocating pressure from a supply source, and via an automatically load-dependent brake-power controller to the wheel-brake cylinders of a rear axle and from a supply source to the wheel-brake cylinders of a front axle of a motor vehicle. Wear sensors are provided for detecting the respective residual lining thickness of the wheel-brake linings, the output signals from the wear sensors being fed to control electronics which, in the event of differing wear of the linings on the two axles, generate a signal for activating a solenoid valve, which corrects the brake pressure on the wheel brakes of one axle. Instead of correcting the brake pressure on the wheel brakes of the respective axle which have greater wear in comparison with the wheel brakes of the other axle, according to the invention a correction of the brake pressure takes place always only on the wheel brakes of one axle only this axle being assigned a solenoid valve.

12 Claims, 2 Drawing Sheets

BRAKE PRESSURE CONTROL DEVICE FOR OPTIMIZING THE BRAKE-LINING WEAR OF MOTOR VEHICLE BRAKES

BACKGROUND AND SUMMARY OF THE INVENTION

The invention relates to a brake-pressure control device for optimizing the brake-lining wear of motor vehicle brakes.

A brake-pressure control device of the relevant generic type that the invention is related to is disclosed in German Patent Document DE 3,313,078 C2. In this arrangement, in order to optimize the brake-lining wear, the output signals from the wear sensors are fed to control electronics which, in the event of part brakings in the range of very low brake pressures, reduce or curb the brake pressure on those wheel brakes having greater wear in comparison with other wheel brakes by means of solenoid valves controlled by the control electronics.

An object of the invention is to provide a brake-pressure control device which is of simpler design for optimizing brake-lining wear.

In a brake-pressure control device of the relevant genetic type, this object is achieved, according to preferred embodiments of the invention by means of an arrangement wherein a correction of the brake pressure takes place always only on the wheel brakes of one axle and only this axle is assigned a solenoid valve.

Thus, whereas, in the known device, action always takes place on those wheel brakes with one axle which have greater wear in comparison with the wheel brakes of the other axle, the invention is based on the knowledge that optimization of wear can also take place by connecting the brake pressure always only on the wheel brakes of one axle. Advantageously, a device of this kind can be combined with or adapted to existing brake systems in an especially simple way.

Other objects, advantages and novel features of the present invention will become apparent from the following detailed description of the invention when considered in conjunction with the accompanying drawings.

DETAILED DESCRIPTION OF THE DRAWINGS

Figure 1:
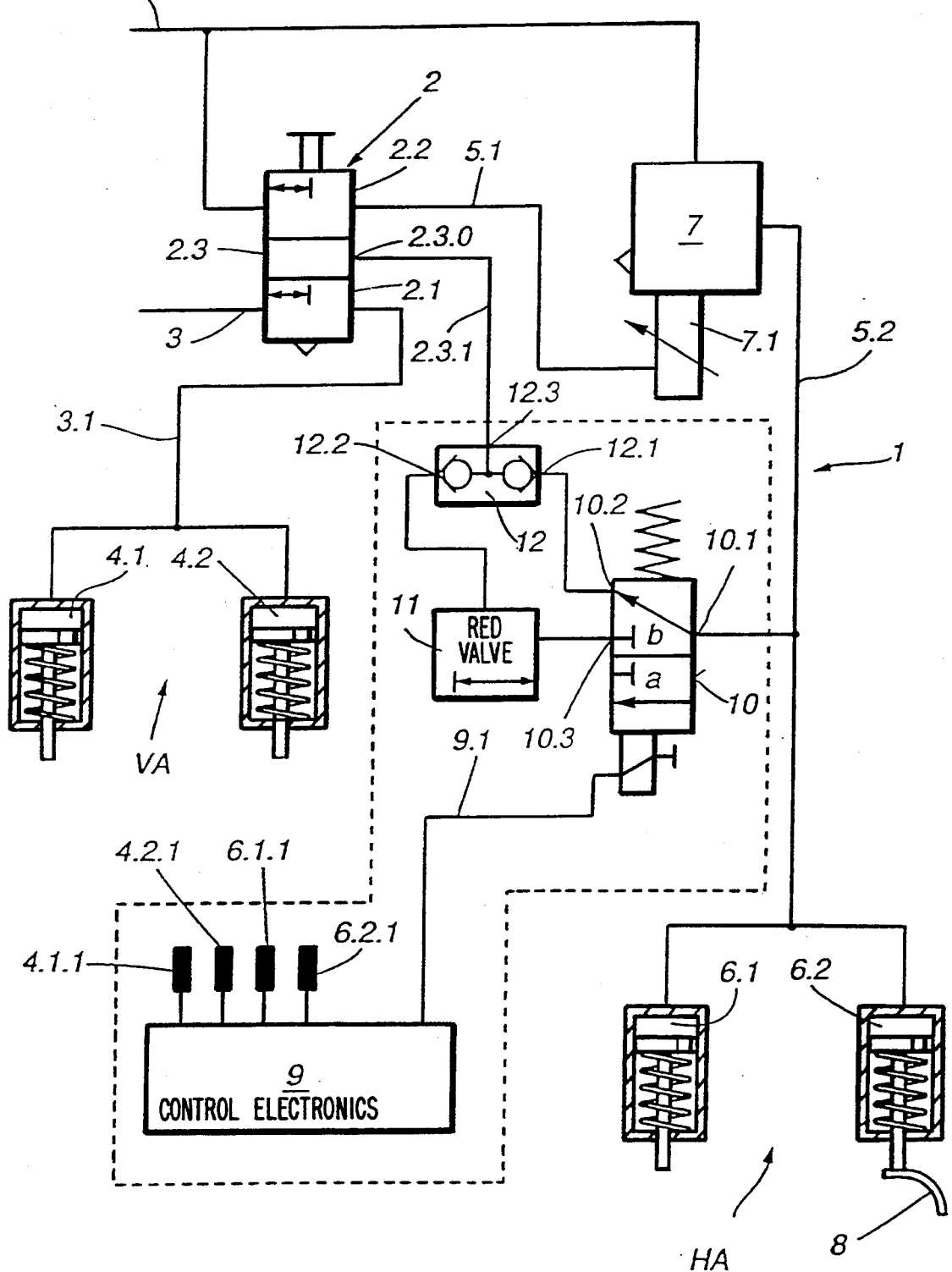
FIG. 1 shows a first exemplary embodiment of the invention with a brake-pressure correction on the front axle.

The motor-vehicle brake system 1 shown diagrammatically in FIG. 1 comprises a dual-circuit service brake valve 2—2.1 for the front axle VA and 2.2 for the rear axle HA. Brake system 1 feeds pressure medium from pressure reservoirs via separate lines 3, 3.1 to the brake cylinders 4.1, 4.2 of the front axle and via separate lines 5, 5.1, 5.2 to the brake cylinders 6.1, 6.2 of the rear axle. Inserted in a known way between the supply line 5 and the brake delivery line 5.2 to the rear axle is an ALB controller 7 for automatic load-dependent brake-power regulation, the control input 7.1 of which is connected to the service-brake valve 2.2 via the line 5.1. The brake cylinders are actuating members which, as indicated diagrammatically on a brake cylinder 6.2 of the rear axle, displace brake linings 8 in such a way that frictional engagement on the respective wheel generates deceleration effects on the wheel. At least one brake lining 8 of each brake cylinder is assigned a brake-lining wear sensor 4.1.1, 4.2.1, 6.1.1, 6.2.1 which detects the residual thickness of the respective brake lining and which feeds it as an output signal to control electronics 9.

Connected, furthermore, to the brake delivery line 5.2 leading from the ALB controller 7 to the brake cylinders 6.1, 6.2 of the rear axle is the input 10.1 of a solenoid valve which is designed as a 3/2-way change-over valve 10 and which can be activated by the control electronics 9 via an electrical control line 9.1. The change-over valve 10 is connected at one output 10.2 directly and at its other output 10.3 via a reducing valve 11 to the inputs 12.1, 12.2 of a two-way valve 12, the output 12.3 of which is connected via a control delivery line 2.3.1 to the control connection of a load/no-load valve 2.3 integrated in a known way into the service-brake valve 2. In general, via a load/no-load valve, the brake pressure of the front axle is also controlled in a load-dependent manner via the brake cylinder pressure of the rear axle.

With the service-brake valves normally used, the brake pressure of the front axle "trails" that of the rear axle as the result of prevailing mechanical conditions. That is to say, with the ALB controller fully advanced (=vehicle loaded), the brake pressure obtained on the front axle is approximately 0.3 ... 0.4 bar lower than that on the rear axle, irrespective of the brake pedal travel, and, with the vehicle loaded, this consequently leads to a greater wear of the brake linings on the rear axle than on the front axle. According to the teaching of the invention, therefore, the service-brake valve is set at or designed for as low a pressure lead as possible, for example approximately 0.1 ... 0.2 bar, with the result that the lining wear is shifted from the rear axle to the front axle. In order, arising from this, to prevent a higher lining wear from occurring on the front axle of the vehicle in trips predominantly undertaken with the vehicle empty or partly loaded, the brake pressure of the front axle is reduced as required via the control pressure at the load/no-load valve 2.3 by means of the circuit described above.

The following fundamental mode of operation is then obtained:

With lining wear on the front and rear axles compensated, the change-over valve 10 is not activated by the control unit 9, that is to say it does not receive current and is in its position of rest (b) shown in the drawing. That is to say, during a braking, the brake pressure discharged into the brake delivery line 5.2 in a load-dependent manner by the ALB controller 7 acts in a hitherto known way on the brake cylinder 6.1, 6.2 of the rear axle on the one hand and on the control connection 2.3.0 of the load/no-load valve 2.3 on the other hand.

When a greater wear of the brake linings 8 on the front axle VA is sensed, a signal is generated by the control unit 9 in order to activate the change-over valve 10, that is to say the latter receives current and switches into its working position (a). The discharged brake pressure in the brake delivery line 5.2 is now applied via the change-over valve 10 to the input of the reducing valve 11, in which it is reduced according to the characteristic of the latter and, via its output, is now applied at a reduced discharged brake pressure to the control connection 2.3.0 of the load/no-load valve 2.3, thereby resulting in a corresponding reduction of the front-axle brake pressure.

The characteristic of the reducing valve 11 is advantageously determined so that, in conjunction with the load/no-load ratio installed specifically to the particular vehicle, the maximum pressure reduction in the part-braking range is limited to approximately 0.5 bar.

As is evident, the brake-pressure control device. described can be produced at a low outlay by the use of known and proven components.

Figure 2:
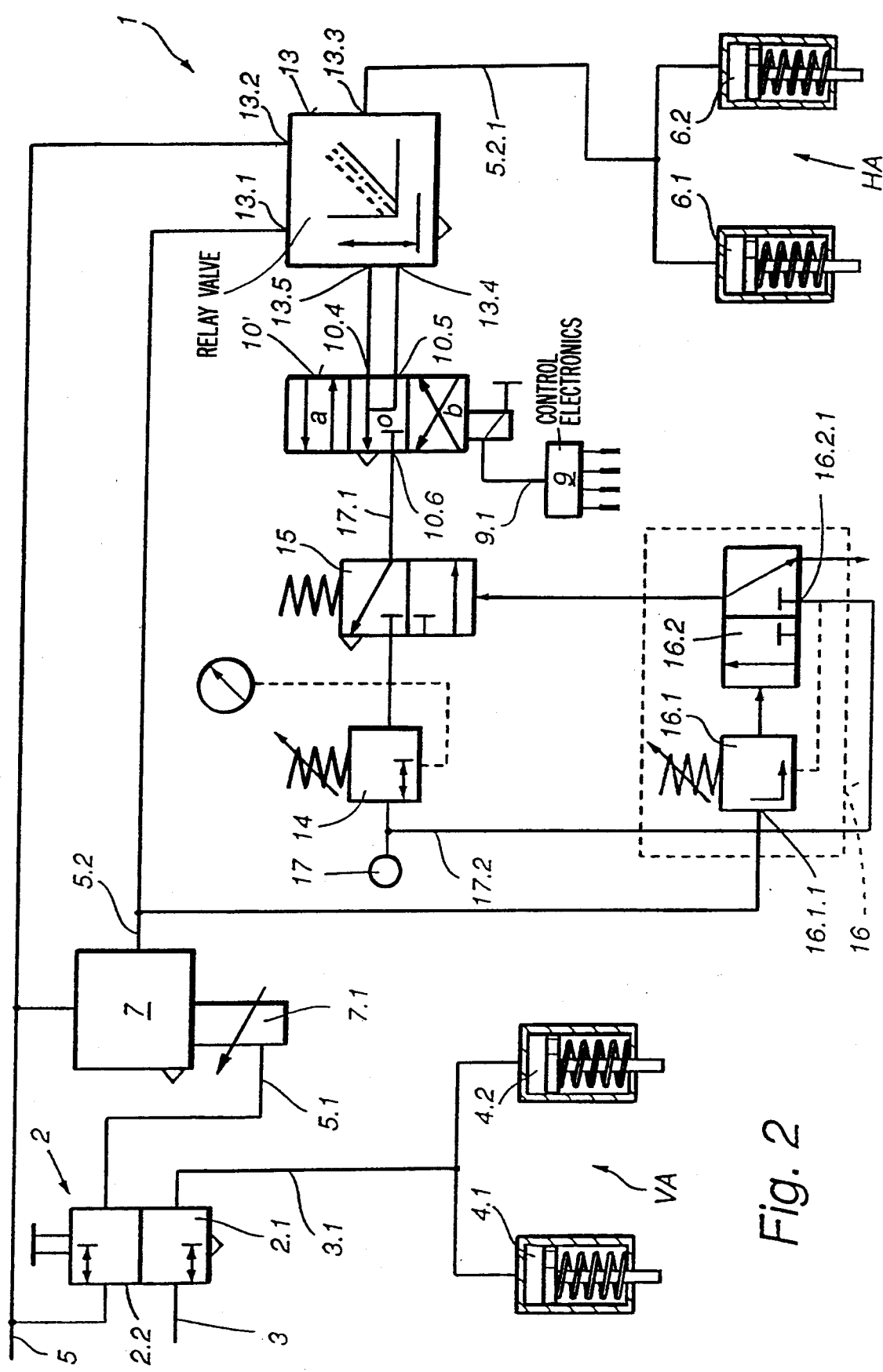
FIG. 2 shows a second exemplary embodiment of the invention with a brake-pressure correction on the rear axle.

In the motor-vehicle brake system 1 shown diagrammatically in FIG. 2, now, in contrast with FIG. 1, a control device is adapted to the brake delivery line 5.2 leading from the ALB controller 7 to the wheel-brake cylinders 6.1, 6.2 of the rear axle HA. For this purpose, the rear-axle brake pressure discharged in a load-dependent manner in the brake delivery line 5.2 by the ALB controller 7 is conveyed as a control pressure to the control input 13.1 of a relay valve 13, the input 13.2 of which is connected to the supply line 5 and the output 13.3 of which is connected to the wheel-brake cylinders 6.1, 6.2 of the rear axle HA via a brake delivery line 5.2.1. Furthermore, the relay valve 13 also has two control inputs 13.4 and 13.5, and when the control inputs 13.4, 13.5 are pressure-less the control pressure introduced to the control input 13.1 can be discharged from the input 13.2 to the output 13.3 in the ratio 1:1. The control inputs 13.4, 13.5 are connected to the outputs 10.4, 10.5 of the solenoid valve 10' which is designed as a 4/3-way change-over valve and to the input 10.6 of which leads from a supply source 17 to a delivery line 17.1, in which are inserted in series a pressure regulator 14 and a 3/2-way control valve 15 which can be changed over in terms of pressure by a pressure-switching valve 16. The pressure-switching valve 16 itself consists of a 3/2 way valve 16.2 and of a pressure relief valve 16.1 which can activate the latter and the pressure input 16.1.1 of which is connected to the brake delivery line 5.1 at the output of the ALB controller 7, whilst the input 16.2.1 of the 3/2-way valve 16.2 is connected to the supply source 17 via the delivery line 17.2.

By means of the control device described above, both an increase in pressure and a reduction in pressure of the rear-axle brake pressure can be carried out as follows:

The value of the desired connecting pressure approximately 0.2 . . . 0.3 bar—, that is to say the amount of pressure by which the brake pressure (in the delivery line 5.2) introduced via the ALB controller 7 can in relation to the discharged brake pressure (in the delivery line 5.2.1) be increased (for example, empty vehicle—increased brake-lining wear on the front axle) or reduced (for example, loaded vehicle—increased brake-lining wear on the rear axle), can be set indirectly either manually or automatically via the pressure regulator 14. The 3/2-way control valve 15, in conjunction with the pressure-switching valve 16, ensures that the pressure correction becomes effective only from a brake pressure of, for example, higher than one bar, introduced into the brake delivery line 5.2, since only then does the pressure relief valve 16.1 switch the 3/2-way valve 16.2 to transmission and, as the result of the from the supply source 17, then applied to the 3/2-way control valve 15, switch the latter into its transmitting position, whereupon the regulator pressure proportional to the correcting pressure and settable m fixedly or variably on the pressure regulator, is applied to the input 10.6 of the solenoid valve 10' via the line 17.1. The type of pressure influencing can be predetermined via the solenoid valve 10' with its three switching positions (O,a,b):

- 0: without correction, outputs 10.4, 10.5 are pressure-less,
- a: pressure increase, output 10.5 is at regulator pressure, as is the control input 13.4 for the pressure increase of the relay valve 13,
- b: pressure reduction, output 10.4 is at regulator pressure, as is the control input 13.5 for pressure reduction of the relay valve 13.

The solenoid valve 10' is activated via the electrical control line 9.1 by the control electronic 9, to which are fed, as in FIG. 1, the output signals from the brake-lining wear sensors 4.1.1, 4.2.1–6.1.1, 6.2.1 detecting the residual thickness of the respective brake lining.

If, for example, increased wear of the brake linings is sensed on the wheel brakes of the rear axle, the control electronics 9 generate a signal for activating the solenoid valve 10' into its switching position (b). The regulator pressure then applied to the control input 13.5 of the relay valve 13 loads a piston in the relay valve 13, so that the discharged brake pressure at the output 13.3 is reduced by a fixed correcting pressure (proportional to the regulator pressure and dependent on the surface ratio specific to the valve).

A compensating wear behavior of the brake linings is then brought about by means of this reduced rear-axle brake pressure.

Conversely, when increased wear of the brake linings is sensed on the wheel brakes of the front axle, the solenoid valve 10' is switched into its switching position (a), with the result that the regulator pressure then applied to the control input 13.4 of the relay valve 13 ensures, in the relay valve, that the discharged brake pressure at the output 13.3 is increased by a fixed correcting pressure.

With a sufficiently exact sensing of the lining thicknesses, a compensated wear behavior can thus be; obtained with correcting-pressure values of approximately 0.2 . . . 0.3 bar, from the start of use of the vehicle with new brake linings, by correcting the brake pressure on only one axle. From the description herein, this control device can be integrated into a known brake system in a simple way.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Brake system for a vehicle of the type having front and rear vehicle axles, comprising:
 a first front wheel brake for braking a first front wheel at the front vehicle axle, said first front wheel brake including a first front brake cylinder and a first front wheel brake lining movable in response to fluid pressure in the first front brake cylinder to apply braking forces to the first front wheel,
 a first rear wheel brake for braking a first rear wheel at the rear vehicle axle, said first rear wheel brake including a first rear brake cylinder and a first rear wheel brake lining movable in response to fluid pressure in the first rear brake cylinder to apply braking forces to the first rear wheel, service brake valve apparatus for allocating fluid pressure from a supply source to the first front and first rear brake cylinders, an automatically load-dependent brake-power ALB controller for controlling the service brake valve apparatus, wear sensors for sensing respective residual thicknesses of the first front and first rear wheel brake linings, a single solenoid valve which is operable to correct brake pressure in only one of the first front and first rear brake cylinders, and control electronics responsive to output signals from the wear sensors to activate the single solenoid valve to correct brake pressure in the only one of the first front and first rear brake cylinders when uneven wear is detected by the wear sensors, said control electronics and ALB controller being configured to accommodate correction of brake pressure via the single solenoid valve for conditions of excess brake lining wear at either of the first front and first rear brake linings.

2. Brake system according to claim 1, comprising:

a second front wheel brake for braking a second front wheel at the front vehicle axle, said second front wheel brake including a second front brake cylinder and a second front wheel brake lining movable in response to fluid pressure in the second front brake cylinder to apply braking forces to the second front wheel, said first and second front wheel brakes forming a front set of wheel brakes, a second rear wheel brake for braking a second rear wheel at the rear vehicle axle, said second rear wheel brake including a second rear brake cylinder and a second rear wheel brake lining movable in response to fluid pressure in the second rear brake cylinder to apply braking forces to the second rear wheel, said first and second rear wheel brakes forming a rear set of wheel brakes, and wear sensors for sensing respective residual thickness of the second front and second rear wheel brake lining, wherein the service brake valve apparatus allocates fluid pressure from the supply source to the respective cylinders of the front and rear sets of wheel brakes, wherein the single solenoid valve is operable to correct brake pressure in the brake cylinders of only one of the front and rear sets of wheel brakes, and wherein the control electronics is responsive to output signals from the sensors to activate the single solenoid valve to correct brake pressure in the brake cylinders of only one of the front and rear sets of wheel brakes when uneven wear is detected by the wear sensors, said control electronics and ALB controller being configured to accommodate correction of brake pressure via the single solenoid valve for conditions of excess brake lining wear at the brake lining of either of the front and rear sets of wheel brakes.

3. Brake system according to claim 2, wherein the single solenoid valve is operable to control brake pressure in the brake cylinders of the front set of wheel brakes.

4. Brake system according to claim 3, wherein the service brake valve apparatus includes a load/no load valve which is set with a minimal pressure lead of brake pressure at the brake cylinders of the rear set of wheel brakes in relation to brake pressure at the brake cylinders of the front set of wheel brakes, comprising a reducing valve and a two-way valve said reducing valve having a reducing valve input and a reducing valve output, said two-way valve having a two-way valve output and first and second two-way valve inputs, said two-way valve output being communicated with the load/no load valve to cause correction of the pressure distribution between the front and rear sets of wheel brake cylinders, said reducing valve output being communicated to the first two-way valve input, and wherein the solenoid valve is a 3/2-way changeover valve having:

a solenoid valve input connected to a brake delivery line leading from the ALB controller to the rear set of wheel brake cylinders, a first solenoid valve output connected directly to the second two-way valve input, and a second solenoid valve output connected to the reducing valve input.

5. Brake system according to claim 2, wherein the single solenoid valve is operable to control brake pressure in the brake cylinders of the rear set of wheel brakes.

6. Brake system according to claim 2, wherein the service brake valve apparatus includes a load/no load valve which is set with a minimal pressure lead of brake pressure at the brake cylinders of the rear set of wheel brakes in relation to brake pressure at the brake cylinders of the front set of wheel brakes, comprising a reducing valve and a two-way valve, said reducing valve having a reducing valve input and a reducing valve output, said two-way valve having a two-way valve output and first and second two-way valve inputs, said two-way valve output being communicated with the load/no load valve to cause correction of the pressure distribution between the front and rear sets of wheel brake cylinders, said reducing valve output being communicated to the first two-way valve input, and wherein the solenoid valve is a 3/2-way changeover valve having:

a solenoid valve input connected to a brake delivery line leading from the ALB controller to the rear set of wheel brake cylinders, a first solenoid valve output connected directly to the second two-way valve input, and a second solenoid valve output connected to the reducing valve input.

7. Brake system according to claim 2, wherein the service brake valve apparatus includes a service brake valve having a front brake pressure delivery line leading to the brake cylinders of the front set of wheel brakes and a rear brake pressure delivery line leading to the brake cylinders of the rear set of wheel brakes, comprising:

a pressure actuable relay valve inserted into one of the front and rear brake pressure delivery lines, a pressure supply source, a pressure regulator, a 3/2-way control valve and a delivery line arranged in series with one another, and a pressure switching valve for controlling the 3/2-way control valve, wherein the solenoid valve is a 4/3-way changeover valve having an input connected to the delivery line, and first and second outputs connected to respective first and second control inputs of the relay valve, and wherein the pressure regulator includes means for indirectly setting the correcting pressure applied to the solenoid via the delivery line.

8. Brake system according to claim 7, wherein the relay valve is inserted into the rear brake pressure delivery line.

9. Brake system according to claim 8, wherein the pressure-switching valve is formed from a 3/2-way valve and a pressure relief valve which can activate the latter, an input of the 3/2-way valve being connected to the supply source, and a pressure input of the pressure relief valve being connected to the brake delivery line at the output of one of the ALB controller and the service-brake valve.

10. Brake system according to claim 7, wherein the pressure-switching valve is formed from a 3/2-way valve and a pressure relief valve which can activate the latter, an input of the 3/2-way valve being connected to the supply source, and a pressure input of the pressure relief valve being connected to the brake delivery line at the output of one of the ALB controller and the service-brake valve.

11. Brake system according to claim 1, wherein the single solenoid valve is operable to correct brake pressure in only the first front brake cylinder.

12. Brake system according to claim 1, wherein the single solenoid valve is operable to correct brake pressure in only the first rear brake cylinder.

* * * * *